Feb. 21, 1961     C. V. RAINES     2,972,478
BICYCLE EXERCISE DEVICE
Filed Dec. 3, 1958                          3 Sheets-Sheet 1
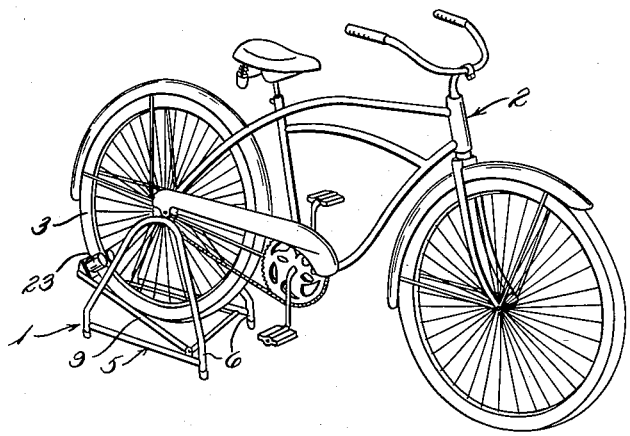
FIG.1
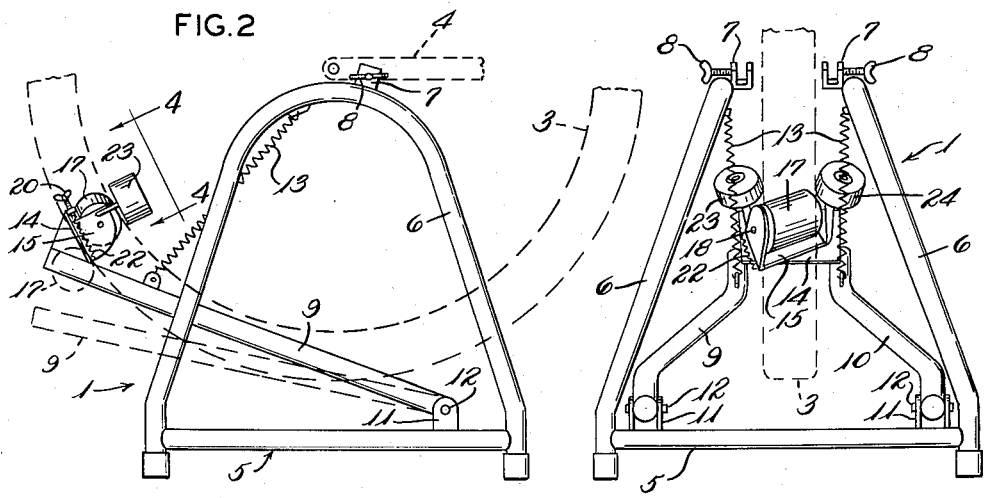
FIG.2                             FIG.3
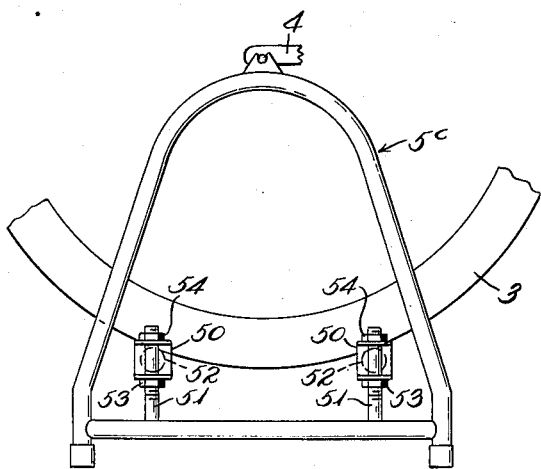
FIG.8
*INVENTOR.*
CARROL VINCENT RAINES
BY
Oldham & Oldham
ATTYS.

Feb. 21, 1961 C. V. RAINES 2,972,478
BICYCLE EXERCISE DEVICE
Filed Dec. 3, 1958 3 Sheets-Sheet 2

INVENTOR.
CARROL VINCENT RAINES

BY

ATTYS.

Feb. 21, 1961  C. V. RAINES  2,972,478
BICYCLE EXERCISE DEVICE
Filed Dec. 3, 1958  3 Sheets-Sheet 3

INVENTOR.
CARROL VINCENT RAINES
BY

ATTYS.

10

United States Patent Office 2,972,478
Patented Feb. 21, 1961

2,972,478
BICYCLE EXERCISE DEVICE
Carrol Vincent Raines, 204 N. Forge St., Akron 4, Ohio
Filed Dec. 3, 1958, Ser. No. 778,014
7 Claims. (Cl. 272—73)

The present invention relates to bicycle exercising devices, and especially to an attachment separate from, but usable with, a bicycle to provide special exercising conditions for a person operating the bicycle.

Heretofore there have been various types of exercise devices proposed for use and where the devices have been similar to bicycles. Some of such exercise devices have been relatively complicated and have been of a special purpose. Other types of exercise devices have been proposed whereby the devices are of the support stand type separate from a bicycle, but used to prevent movement of the bicycle when its pedals are operated. Examples of such constructions are shown in Patents Nos. 592,093 and 2,043,977. One difficulty encountered with such latter styles of exercise devices has been that the exercise devices merely provide some kind of a roller support for a bicycle wheel to establish operating conditions for the bicycle substantially like normal operating conditions.

The general object of the present invention is to provide a novel and improved style of exercise device separate from a bicycle but usable therewith and characterized by its ability to provide a controllable, or adjustable drag or resistance to the operation of a bicycle associated with the apparatus of the invention.

A further object of the invention is to provide, in an exercise device for use with a bicycle, a roller for engaging the bicycle wheel but where the roller is movable to provide a controllable acute angle with the axis of the bicycle wheel so that a variable drag can be provided to resist rotation of the bicycle wheel.

Another object of the invention is to provide an exerciser device for use with a bicycle and wherein the device is automatically adapted to adjust itself for reception of bicycles of varying diameter wheels in the apparatus of the invention.

A further object of the invention is to provide an exercise device for use with a bicycle and wherein a frame is provided and has adjustable means being associated therewith to adapt the frame to receive bicycles of varying diameter wheel sizes therein, and wherein a second support in the form of a roller is provided in the device for engaging the periphery of a bicycle wheel to set up a controllable drag thereon.

Another object of the invention is to provide a guide for engaging a bicycle wheel to set up a controllable and adjustable, but constant drag on the bicycle wheel to create more resistance to its rotation than would be encountered by normal operation of the bicycle upon a roller support, where the bicycle is positioned upon a stationary stand.

The foregoing and other objects and advantages of the invention will be made more apparent as the specification proceeds.

The present invention will be particularly described with relation to the accompanying drawings, wherein:

Fig. 1 shows a perspective view of the exercise device of the invention and with a bicycle being shown in operative engagement therewith;

Fig. 2 is a side elevation of the exercise device of the invention with a portion of the bicycle wheel and frame being diagrammatically indicated in association therewith;

Fig. 3 is a right end elevation of the apparatus of Fig. 2 with the position of a bicycle wheel being indicated in chain dotted lines;

When referring to corresponding members shown in the drawings and referred to in the specification, corresponding numerals are used to facilitate comparison therebetween.

Figure 4:
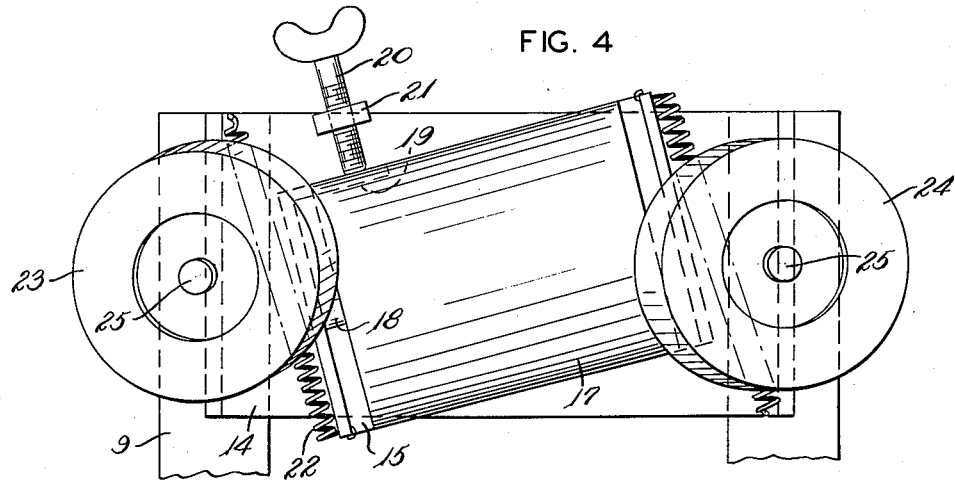
Fig. 4 is an elevation of the specific bicycle support roller means of the invention, and which view is taken on line 4—4 of Fig. 2.

Generally speaking, this invention covers an exercise device that includes a frame, means on said frame for supporting a bicycle frame thereon, bracket means operatively and pivotally carried by said frame, which bracket means usually are adjustably positioned with relation to the bicycle supporting means on the frame, roller means journalled on said bracket means and adapted to engage a wheel of a bicycle supported on said frame, and adjustable means connecting said bracket means to said frame to turn said roller means to a variable but controllable angle to the plane of a wheel engaging said roller means to set up a variable drag on such wheel.

Referring now to the details of the structure of the novel exercise device of the invention shown in the drawings, such exercise device is indicated as a whole by the numeral 1. This exercise device is adapted to be used with a bicycle 2 which is removably supported on the exercise device of the invention. Specifically, the novel apparatus of the invention is adapted to apply a controllable restraining force to the rear wheel 3 of the bicycle 2 and a portion of the frame 4 of the bicycle 2 is supported on the exercise device to maintain the bicycle 2 upright and to keep the rear wheel 3 thereof out of engagement with any associated surface except portions of the exercise device, as hereinafter described.

The novel device or article of the invention includes a support frame or stand 5 that includes a pair of vertically upwardly extending uprights, or frame sections 6 that are substantially parallel with each other but in the embodiment of the invention shown are inclined slightly inwardly towards each other to receive the rear wheel 3 therebetween.

Some type of suitable support means, in this instance U-shaped brackets 7 are secured, as by welding, to the upper portions of the uprights 6 and are adapted to receive portions of the bicycle frame 4 adjacent the rear wheel 3 therein. Clamp screws 8 may be provided on the brackets 7 to retain the frame 4 in engagement with such upright brackets. Fig. 2 indicates that the rear wheel 3 is positioned appreciably above the support surface or floor on which the stand or support 5 is positioned.

As an important feature of the present invention, an adjustably positioned support arm means, in this instance, a pair of support arms 9 and 10 are pivotally secured to the support 5 adjacent the front portion thereof, as by means of brackets 11. Pins 12 engage both the support arms 9 and 10 and the brackets 11 for providing pivotal movement of the support arms in a vertical direction intermediate the uprights 6. The support arms 9 and 10 are resiliently urged vertically upwardly towards the upper portion of the support 5, as by means of coil springs 13, connected under tension to the free ends of the pivotally supported support arms 9 and 10 and to the upper portions of the support 5. These support arms 9 and 10 thus are adapted to adjust, automatically, as hereinafter described in detail, so that varying diameter wheels 3 of a bicycle can be positioned in the exercise device and be operatively associated therewith.

A support plate, or tie plate 14 is secured, as by welding, to the support arms 9 and 10 and extends therebetween adjacent the free ends thereof. Such tie plate 14 has a U-shaped bracket 15 secured thereto by any suitable means, such as a lock bolt and nut 16.

Figure 5:
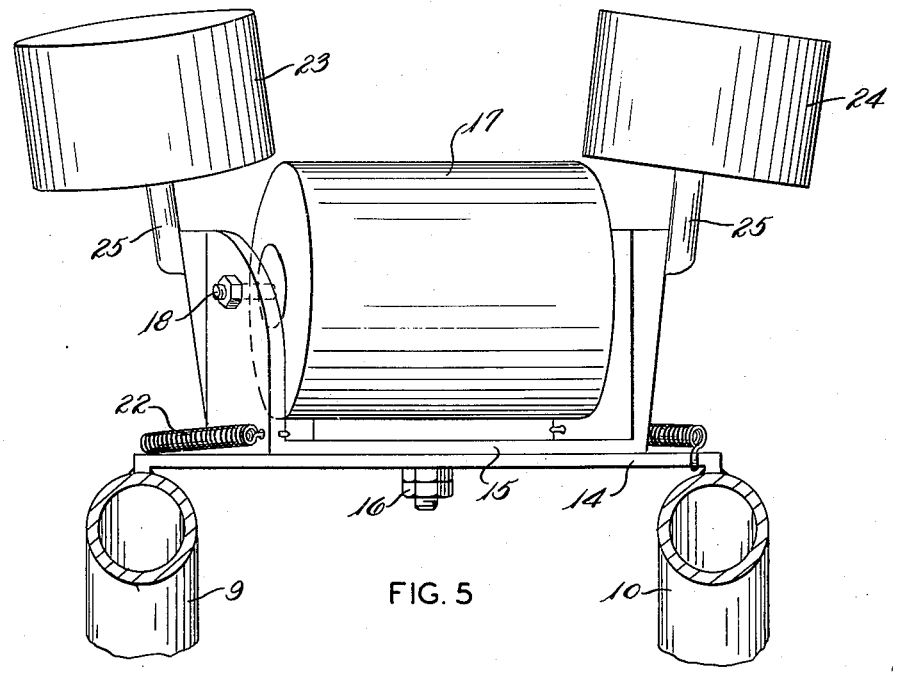
Fig. 5 is an elevation, partially shown in vertical section, of the bicycle supporting roller and associated means of the apparatus of the invention.

The details of the means positioned by this U-shaped bracket 15 are best shown in Figs. 4 and 5 of the drawing and comprise an important feature of the invention. Such bracket 15 positions or journals roller means thereon, and one cylindrical roller 17 is shown journaled on a shaft 18, which shaft is secured to and extends between the ears on the bracket 15. The roller 17 normally is positioned at least substantially parallel to the axis of the rear wheel 3 of the bicycle 2 but with the roller being positioned so as to be set at a variable, but controllable, small acute angle to the rear wheel axis. Hence the bracket 15 has an end flange or plate 19 thereon and a set screw 20 is shown in bearing engagement with such flange 19. The set screw 20 is positioned by means of a tapped flange or plate 21 secured to the tie plate 14 whereby rotation of the set screw 20 moves it along its own axis and causes the U-shaped bracket 15 to be moved pivotally about the bolt 16 farther from parallel relation with the transverse axis of the bracket 15. As only pressure engagement is shown between the set screw 20 and the bracket 15, a return spring 22 is provided and is secured between a portion of the tie plate 14 and an end portion of the bracket 15 to draw such members back into parallel relationship with each other when the pressure on the set screw 20 is removed. It will be realized that should the set screw 20 have some type of permanent but relatively rotatable engagement with the bracket 15, then the spring 22 is not required and rotation of the set screw 20 will move the bracket 15 towards or from the parallel relationship with the transversely extending tie plate 14, as desired.

In some instances it also is desirable to be certain that the bicycle rear wheel 3 does not tend to move beyond the lateral margins of the roller means 17 and thus an additional pair of rollers 23 and 24 are positioned on substantially vertically extending shafts 25. These shafts 25 are secured to the end portions of the bracket 15 so that, as the roller means and the associated apparatus of the invention are turned to desired acute angular relationship with regards to the axis of the rear wheel 3, one or both of such rollers 23 and 24 may be brought into engagement with the sidewalls of a tire on this rear wheel 3 to aid in maintaining the apparatus and bicycle in engagement.

It should be realized that the adjustment of the angle of the roller means 17 to deviate from a parallel relationship with the axis of the rear wheel 3 will cause an increase in the resistance to rotation of the rear wheel 3 and cause further effort to be expanded by a person endeavoring to pump the pedals of the bicycle 2. Such resistance can be easily controlled and provide effective exercise action for any person using the bicycle 2.

Figure 6:
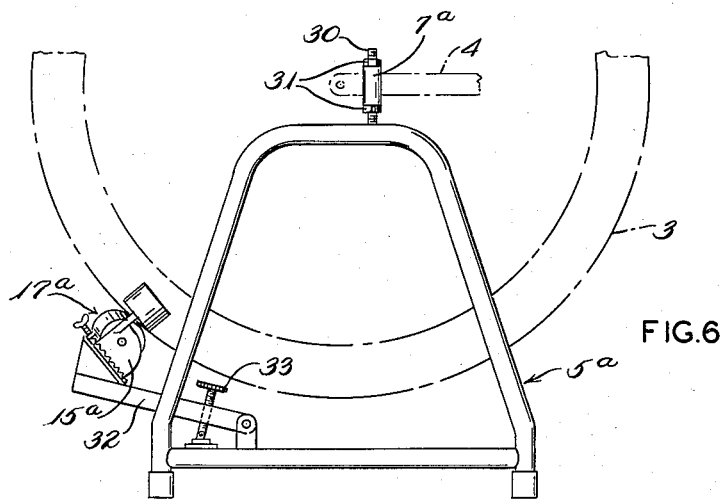
Figs. 6 and 7 are elevations of modifications of the invention.

Some type of vertically adjustable means, like the means shown in Patent No. 592,093, may be provided to give vertical adjustment to the support stand and permit the roller means and associated parts of the apparatus to be either fixedly positioned, or to be slightly adjustable, on a support used in the apparatus. A support stand 5a in Fig. 6 has suitable brackets 7a secured thereto. These brackets 7a are vertically adjustable on threaded uprights 30 on the stand 5a. Lock nuts 31 retain the brackets 7a, or sleeves, in a given position to engage a bicycle frame for support action. The novel roller means 17a of the invention are positioned on a bracket 15a for pivotal movement as previously described. The bracket 15a is positioned on an arm or arms 32, the angle of which, with relation to the remainder of the stand 5a, can be varied by a control set screw 33.

Figure 7:
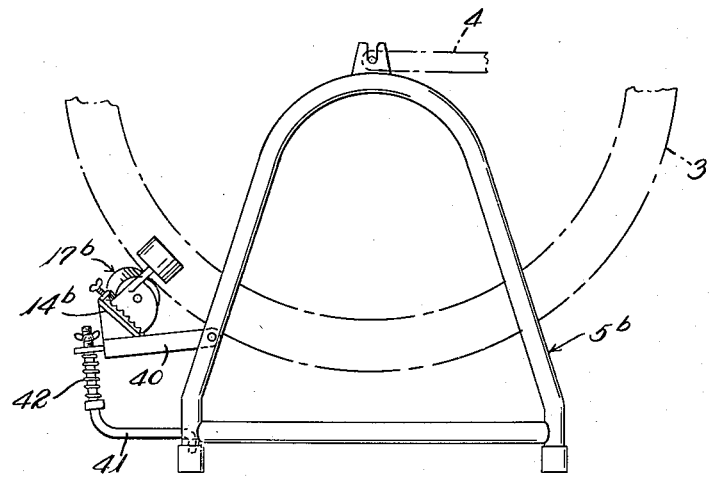

It should be realized that in some instances it may be desirable to use other types of support stands, such as one shown in Fig. 7. In such instance, the improved adjustable support means for the roller means 17b of the invention would mount it so that it could be moved into adjustable pressure engagement with the rear wheel of the bicycle and with the roller means also being movable in a plane including its longitudinal axis, so that the desired controllable additional pressure of the apparatus could be brought into operation to restrain operation of the bicycle pedals and cause desired exercise action to the person using the bicycle. A stand 5b suitably supports a bicycle frame thereon and pivotally mounts a positioning arm 40. The roller means 17a is adjustably positioned on such arm 40 and a tie plate 14b thereon as in the other embodiments of the invention. A rod 41 engages an end portion of the arm 40, while a spring 42 on the rod 41 urges the arm 40 towards the bicycle wheel to place restraining forces thereon by the roller means 17a.

In some instances it also might be desirable to replace the coil springs 13 that support the support arms 9 and 10 in the apparatus shown in Figs. 1 to 5 with short springs and turnbuckle-like structures wherein the position of the support arms can be varied by adjusting the length of the turnbuckle connector means in the support.

Fig. 8 shows yet a further modification of the exercise device of the invention wherein a frame 5c is provided. In this instance, brackets 50 are positioned to extend between pairs of threaded studs 51 suitably secured to and extending vertically upwardly from a lower portion of the frame. The brackets 50 are adapted to position suitable roller means 52 to extend between the brackets 50 and be suitably journalled on or carried by the brackets for rotary action. Suitable lock nuts 53 and 54 are also provided on each of the studs 51 so that the vertical position of the brackets 50 can be regulated to compensate the apparatus of the invention for positioning bicycle wheels of varying diameters therein. Thus in this instance the rollers 52 may not have any angular adjustment action provided therefor, or one may have such action, as desired, so that yet another type of support is provided by the invention to engage bicycle wheels for providing a drag action thereon.

In some instances, it also may be desirable to provide lateral adjustment for a roll, such as the rolls 23 and 24 shown in Fig. 5. Thus these rolls could be positioned so that they can be screwed or otherwise urged laterally inwardly for resilient pressure engagement with the sidewalls of the tire. Such compression action on the sidewalls of the tire would be separate, preferably, from any twisting of the main roller on its axis.

It will be realized that the roller means of the invention will always be positioned in the frame or support so that some load can be placed on the bicycle wheel by the roller means and that the load will be varied by change of the angle of the roller means with the axis of the bicycle wheel. The frame or support used normally carries the major portion of the load by support of the bicycle frame.

In view of the foregoing, it is believed that a novel and improved type of an exerciser device has been provided by the present invention. Such device will give very easily controlled exercise or resistance action to a person operating the bicycle. Hence a greatly improved exercise result is obtained than by use of any of the prior art structures that merely apply radially directed compressive forces to a bicycle wheel. Thus it is thought that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. An exercise device for use with a bicycle and comprising a frame including a pair of substantially parallel uprights adapted to receive a bicycle wheel therebetween, support means on said uprights to engage a bicycle frame and position a bicycle rear wheel between said uprights and above the supporting surface for said frame, support arm means pivotally secured at one end to said frame and extending rearwardly therefrom, spring means connecting said support arm means to said frame to urge the free end of said support arm means towards the upper portion of said frame, a bracket pivotally secured to said support arm means for movement in a plane, a roller journalled on said bracket and adapted to engage the rear wheel of a bicycle supported on said frame to apply load to such wheel, and means connecting said bracket to said support arm for positively turning said bracket and said roller to an adjustable acute angle to the axis of a wheel positioned in said frame and engaged by said roller, said roller being movable to said angle which is in said plane which is tangent to a radius of the wheel whereby a variable drag can be placed on such wheel.

2. An exercise device for use with a bicycle and comprising a frame including a pair of substantially parallel uprights adapted to receive a bicycle wheel therebetween, support means on said uprights to engage a bicycle frame and position a bicycle rear wheel between said uprights and above the supporting surface for said frame, support arm means pivotally secured to said frame and extending therefrom, spring means connecting said support arm means to said frame to urge a free end of said support arm means towards the upper portion of said frame, a bracket pivotally secured to said support arm means and extending transversely thereof, roller means journalled on said bracket and positioned to engage the rear wheel of a bicycle supported on said frame to carry some of the load on such bicycle, said roller means having a fixed axial relation parallel to said bracket, and screw means connecting said bracket to said support arm for positively turning said bracket and thus said roller means to an adjustable acute angle to the axis of a wheel positioned in said frame and engaged by said roller means whereby a variable drag can be placed on such wheel, said roller means and bracket being movable in a plane tangent to a radius of the surface of the wheel.

3. An exercise device for use with a bicycle and comprising a frame including a pair of substantially parallel uprights adapted to receive a bicycle wheel therebetween, support means on said uprights to engage a bicycle frame and position a bicycle rear wheel between said uprights and above the lowest portion of said frame, support arm means pivotally secured to said frame extending longitudinally thereof, spring means connecting said support arm means to said frame to urge a free end of said support arm means towards an upper portion of said frame, a bracket pivotally secured to said support arm means, roller means journalled on said bracket and adapted to engage the periphery of the rear wheel of a bicycle supported on said frame to carry some of the load on such wheel, said roller means extending parallel to the axis of said rear wheel, screw means connecting said bracket to said support arm and adapted to turn said bracket positively and thus said roller to an adjustable acute angle defining a plane tangent a radius of a wheel positioned in said frame and engaged by said roller whereby a variable drag can be placed on such wheel, and spring means urging said bracket and roller means towards a position parallel to the axis of said bicycle rear wheel.

4. In an exercise device, a frame, means on said frame for supporting a bicycle frame thereon, bracket means operatively and pivotally carried by said frame, roller means journalled on said bracket means and adapted to engage and partially support a wheel of a bicycle supported on said frame, and adjustable means connecting said bracket means to said frame to turn said bracket means to a variable but controllable angle to the plane of a wheel engaging said roller means, said roller means being maintained in a fixed position with relation to said bracket means whereby movement of said bracket means can move said roller means to a controlled angle with the axis of said wheel to set up a variable drag on such wheel, said roller means having movement on its axis defining a plane tangent to a radius of said wheel.

5. In an exercise device, a frame, adjustable means on said frame for engaging and supporting a bicycle frame thereon, bracket means operatively carried by said frame adjacent the rear wheel of a bicycle on said frame, means urging said bracket means towards and into engagement with the rear wheel of a bicycle supported by said frame, roller means journalled on said bracket means and adapted to engage the rear wheel of a bicycle supported on said frame, and adjustable means connecting said bracket means to said frame to turn said roller means to a variable but controllable angle extending transversely of the axis of a wheel engaging said roller means to set up a variable drag on such wheel, said angle defining a plane tangent to a radius of the wheel.

6. In an exercise device, a frame, means on said frame for supporting a bicycle frame thereon, bracket means operatively and pivotally carried by said frame, a roller journalled on said bracket means and adapted to engage the periphery of a wheel of a bicycle supported on said frame, and adjustable means connecting said bracket means to said frame to turn said roller to a variable retained angle to the plane of the wheel engaging said roller to set up a variable drag on such wheel, said bracket means being movable in a plane tangent to a radius of the wheel.

7. An exercise device as in claim 6 where a pair of additional roller means are journalled on said bracket means, said pair of roller means having parallel axes at right angles to the axis of said roller, said pair of roller means being positioned to contact at least one side portion of the bicycle wheel to aid in maintaining it on said roller.

References Cited in the file of this patent

UNITED STATES PATENTS

| | | |
|---|---|---|
| 553,373 | Webber | Jan. 21, 1896 |
| 2,043,977 | Back | June 16, 1936 |
| 2,163,066 | Searcy | June 20, 1939 |